United States Patent
Tarte

(10) Patent No.: US 8,490,005 B2
(45) Date of Patent: Jul. 16, 2013

(54) VISUAL ENHANCEMENT FOR INSTRUMENT PANEL

(75) Inventor: Christopher Tarte, Roanoke, TX (US)

(73) Assignee: PACCAR Inc, Bellevue, WA (US)

( * ) Notice: Subject to any disclaimer, the term of this patent is extended or adjusted under 35 U.S.C. 154(b) by 655 days.

(21) Appl. No.: 12/711,013

(22) Filed: Feb. 23, 2010

(65) Prior Publication Data

US 2011/0208384 A1 Aug. 25, 2011

(51) Int. Cl.
*G06F 3/048* (2006.01)
*G01M 17/00* (2006.01)
*G09B 15/00* (2006.01)
*B60Q 1/00* (2006.01)

(52) U.S. Cl.
USPC ........ 715/771; 701/29.1; 701/29.4; 84/477 R; 84/478; 715/830; 715/965; 715/966; 715/967; 362/489

(58) Field of Classification Search
USPC ................ 701/14, 29.1, 29.4; 84/477 R, 478, 84/609, 626, 633; 715/771, 830, 965–967; 362/23, 489; 340/459–462; 345/173, 581, 345/589, 593, 594; 382/254, 266, 199; 600/458; 248/27.1
See application file for complete search history.

(56) References Cited

U.S. PATENT DOCUMENTS

| 4,072,924 A * | 2/1978 | Pomerantz | 340/461 |
|---|---|---|---|
| 4,287,503 A * | 9/1981 | Sumida | 340/461 |
| 4,621,306 A | 11/1986 | Sell | |
| 4,787,039 A * | 11/1988 | Murata | 701/1 |
| 4,787,040 A | 11/1988 | Ames | |
| 4,809,177 A | 2/1989 | Windle | |
| 5,241,295 A * | 8/1993 | Madau | 340/461 |
| 5,347,260 A | 9/1994 | Ginzel | |
| 5,371,487 A | 12/1994 | Hoffman | |
| 5,453,939 A | 9/1995 | Hoffman | |
| 5,555,502 A | 9/1996 | Opel | |
| 5,757,268 A * | 5/1998 | Toffolo et al. | 340/461 |
| 5,764,139 A * | 6/1998 | Nojima et al. | 340/461 |

(Continued)

FOREIGN PATENT DOCUMENTS

JP 2005-67406 A 3/2005

OTHER PUBLICATIONS

Office Action mailed Dec. 8, 2011, in U.S. Appl. No. 12/711,016, filed Feb. 23, 2010, 31 pages.

(Continued)

*Primary Examiner* — Mary Cheung
*Assistant Examiner* — Majdi Alsomiri
(74) *Attorney, Agent, or Firm* — Christensen O'Connor Johnson Kindness PLLC

(57) ABSTRACT

Aspects of the disclosed subject matter are directed to a graphical display that provides a visual enhancement in conveying a vehicle reading. In accordance with one embodiment, a method is provided that causes the graphical display to render a border of an instrument with a distinguishing visual attribute. More specifically, the method includes assigning a priority level to an instrument used to convey a vehicle reading. When an abnormal condition is identified, the instrument is assigned an enhanced priority level that corresponds to the abnormal condition. Then, the method causes the graphical display to render the instrument, wherein that border of the instrument is depicted with an enhanced visual attribute indicative of the abnormal condition. In this regard, the enhanced visual attribute distinguishes the instrument from one or more other instruments depicted on the graphical display that are not assigned an enhanced priority level.

20 Claims, 5 Drawing Sheets

U.S. PATENT DOCUMENTS

| | | |
|---|---|---|
| 5,949,346 A | 9/1999 | Suzuki |
| 5,982,352 A | 11/1999 | Pryor |
| 6,008,800 A | 12/1999 | Pryor |
| 6,009,355 A | 12/1999 | Obradovich |
| 6,119,060 A | 9/2000 | Takayama |
| 6,289,332 B2 | 9/2001 | Menig |
| 6,429,845 B1 | 8/2002 | Unseld |
| 6,434,450 B1 | 8/2002 | Griffin, Jr. |
| 6,564,112 B1 | 5/2003 | Factor |
| 6,667,726 B1 | 12/2003 | Damiani |
| 6,693,523 B1 | 2/2004 | Abel et al. |
| 6,788,196 B2 | 9/2004 | Ueda |
| 6,819,056 B2 | 11/2004 | Lin |
| 6,870,469 B2 | 3/2005 | Ueda |
| 6,874,012 B1 | 3/2005 | St. Pierre |
| 6,959,223 B2 | 10/2005 | Ogasawara |
| 6,972,665 B2 | 12/2005 | Wang |
| 6,990,922 B2 | 1/2006 | Ichikawa |
| 7,009,504 B1 | 3/2006 | Banter |
| 7,015,891 B2 | 3/2006 | Lo |
| 7,084,859 B1 | 8/2006 | Pryor |
| 7,310,071 B2 | 12/2007 | Cuprys |
| 7,499,778 B2 | 3/2009 | Obradovich |
| 7,609,152 B2 * | 10/2009 | Crowe et al. ............ 340/461 |
| 7,642,901 B2 * | 1/2010 | Kato et al. ............ 340/438 |
| 7,683,771 B1 | 3/2010 | Loeb |
| 8,125,346 B2 | 2/2012 | Ballard |
| 2001/0012976 A1 | 8/2001 | Menig |
| 2004/0140948 A1 | 7/2004 | Cuprys |
| 2004/0200923 A1 | 10/2004 | Lee |
| 2004/0207334 A1 | 10/2004 | Lin |
| 2004/0212579 A1 | 10/2004 | Lo |
| 2005/0177287 A1 | 8/2005 | Wang |
| 2006/0036335 A1 | 2/2006 | Banter |
| 2006/0218051 A1 | 9/2006 | Westberg |
| 2006/0274213 A1 * | 12/2006 | Saier et al. ............ 348/673 |
| 2007/0063980 A1 | 3/2007 | Eich |
| 2007/0069880 A1 | 3/2007 | Best |
| 2007/0101290 A1 | 5/2007 | Nakashima |
| 2007/0132572 A1 | 6/2007 | Itoh |
| 2008/0122799 A1 | 5/2008 | Pryor |
| 2008/0129684 A1 | 6/2008 | Adams |
| 2008/0129707 A1 | 6/2008 | Pryor |
| 2008/0133133 A1 | 6/2008 | Abels |
| 2008/0192024 A1 | 8/2008 | Mita |
| 2008/0211652 A1 | 9/2008 | Cope |
| 2008/0238838 A1 | 10/2008 | Cunningham |
| 2008/0244460 A1 | 10/2008 | Louch |
| 2009/0112389 A1 | 4/2009 | Yamamoto |
| 2009/0174533 A1 | 7/2009 | Bowden |
| 2009/0174682 A1 | 7/2009 | Bowden |
| 2009/0300548 A1 | 12/2009 | Sullivan |
| 2011/0175754 A1 | 7/2011 | Karpinsky |
| 2011/0181786 A1 | 7/2011 | Yamazaki |

OTHER PUBLICATIONS

Final Office Action mailed May 11, 2012, in U.S. Appl. No. 12/711,016, filed Feb. 23, 2010, 27 pages.

Office Action mailed Dec. 28, 2012, in U.S. Appl. No. 12/711,016, filed Feb. 23, 2010, 29 pages.

Office Action mailed Dec. 9, 2011, in U.S. Appl. No. 12/711,076, filed Feb. 23, 2010, 27 pages.

Final Office Action mailed Sep. 12, 2012, in U.S. Appl. No. 12/711,076, filed Feb. 23, 2010, 30 pages.

Office Action mailed Jul. 13, 2012, in U.S. Appl. No. 12/711,090, filed Feb. 23, 2010, 11 pages.

Restriction Requirement mailed Mar. 23, 2012, in U.S. Appl. No. 12/711,054, filed Feb. 23, 2010, 8 pages.

Office Action mailed Apr. 26, 2012, in U.S. Appl. No. 12/711,054, filed Feb. 23, 2010, 17 pages.

Final Office Action mailed Sep. 26, 2012, in U.S. Appl. No. 12/711,054, filed Feb. 23, 2010, 15 pages.

* cited by examiner

VISUAL ENHANCEMENT FOR INSTRUMENT PANEL

BACKGROUND

Instrument panels within interior surfaces of a vehicle provide an operator with information through a number of commonly used displays. For example, speedometers, odometers, tachometers, fuel level gauges, oil level indicators, and engine temperature gauges are commonly used to convey a vehicle reading. With the prevalence and adoption of electronic control systems, an increasing amount of information may be made available on an instrument panel. For example, tire pressure sensors may report readings that are presented on an instrument panel, thereby preventing a vehicle operator from having to manually check tire pressure. However, the increased availability of information can make operating the vehicle more complex as multiple vehicle systems may need to be monitored. A vehicle operator may have difficulty in identifying vehicle conditions in which corrective action should be taken.

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

Aspects of the disclosed subject matter are directed to a graphical display that provides a visual enhancement in conveying a vehicle reading. In accordance with one embodiment, a method is provided that causes the graphical display to render a border of an instrument with a distinguishing visual attribute. More specifically, the method includes assigning a priority level to an instrument used to convey a vehicle reading. When an abnormal condition is identified, the instrument is assigned an enhanced priority level that corresponds to the abnormal condition. Then, the method causes the graphical display to render the instrument, wherein that border of the instrument is depicted with an enhanced visual attribute indicative of the abnormal condition. In this regard, the enhanced visual attribute distinguishes the instrument from one or more other instruments depicted on the graphical display that are not assigned an enhanced priority level.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Prior to discussing the details of the present disclosure, it should be understood that several sections of the following description are presented largely in terms of logic and operations that may be performed by conventional components. These components, which may be grouped in a single location or distributed over a wide area, generally include processors, memory, storage devices, graphical displays, input devices, etc. In circumstances where the components are distributed, the components are accessible to each other via communication links. In the following description, numerous specific details are set forth in order to provide a description of the present disclosure. It will be apparent to one skilled in the art, however, that the disclosed subject matter may be practiced without some or all of the specific details.

Figure 1:
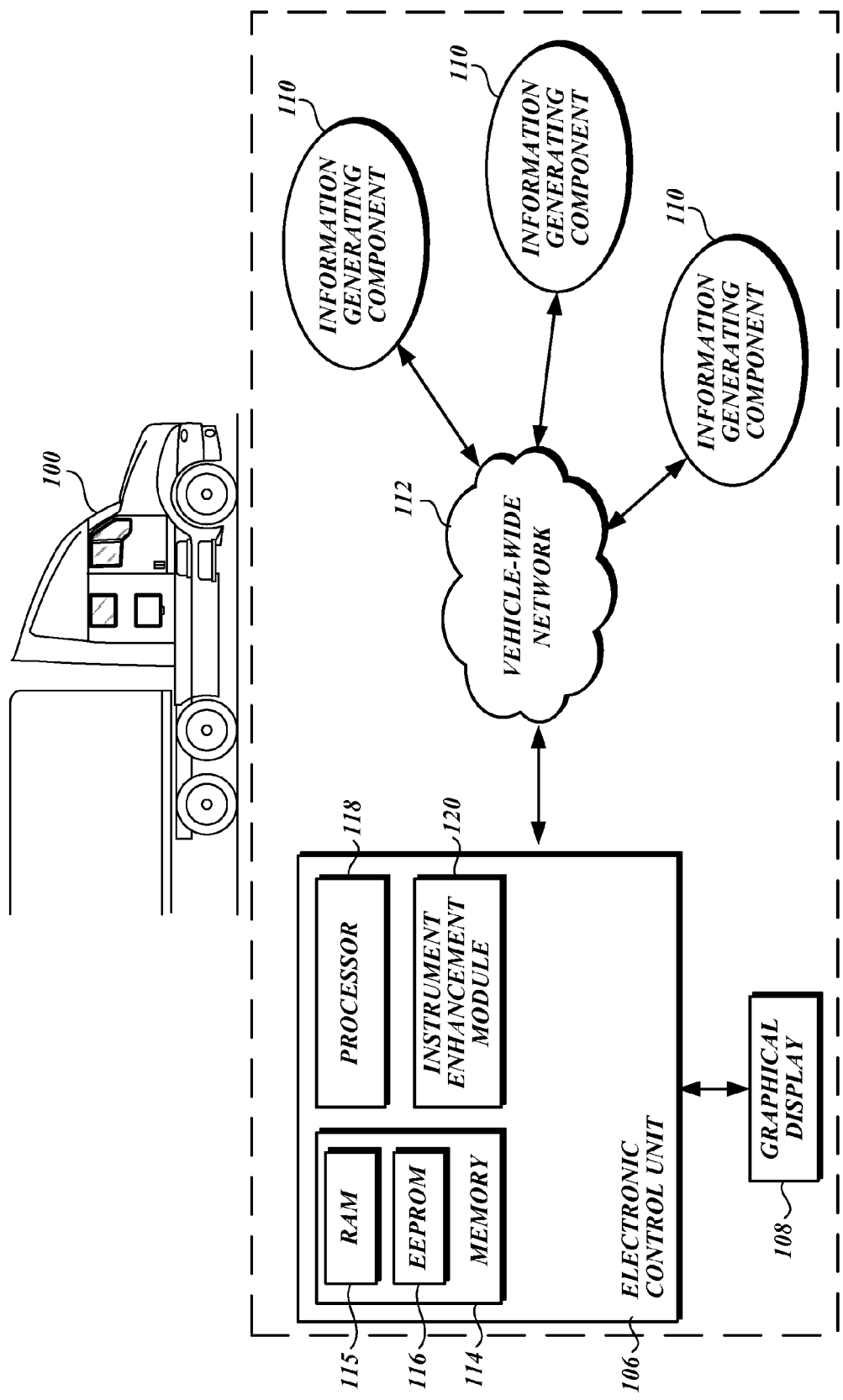
FIG. 1 is a pictorial depiction of an exemplary system architecture that illustrates components suitable for implementing aspects of the disclosed subject matter.

FIG. 1 and the following discussion is intended to provide a brief, general description of a system architecture in a truck 100 for implementing aspects of the present disclosure. In the example depicted in FIG. 1, the truck 100 includes an electronic control unit 106 that is associated with a graphical display 108. As described in further detail below, the graphical display 108 is used to present information to a vehicle operator. In addition, the electronic control unit 106 is communicatively connected to a set of information generating components 110 via a vehicle-wide network 112. One of ordinary skill in the art will appreciate that the system architecture of the truck 100 will include many more components than those depicted in FIG. 1. However, it is not necessary that all of these generally conventional components be shown or described. Moreover, while FIG. 1 depicts a truck 100, another type of "vehicle" such as a car, boat, recreational vehicle ("RV"), vessel, etc., may be used to implement aspects of the present disclosure.

As further illustrated in FIG. 1, the electronic control unit 106 may communicate with the information generating components 110 over the vehicle-wide network 112. Those skilled in the art and others will recognize that the vehicle-wide network 112 may be implemented using any number of different communication protocols such as, but not limited to, Society of Automotive Engineers' ("SAE") J1587, SAE J1922, SAE J1939, SAE J1708, and combinations thereof. It will be appreciated, however, that the disclosed subject matter is not limited to any particular type or configuration of control unit, or to any specific control logic for governing operation of the vehicle.

In the illustrative embodiment depicted in FIG. 1, the truck 100 includes an electronic control unit 106. Generally described, the electronic control unit 106 serves as an in-vehicle computing device that manages the collection and dissemination of information. The electronic control unit 106 may collect information over the vehicle-wide network 112 from the information generating components 110. The collected information may be processed so that the appropriate readings may be presented on the graphical display 108. In this regard and by way of example only, the information generating components 110 may report information about a number of vehicle systems, including but not limited to vehicle and engine speed, fluid levels, tire pressure monitoring, battery level, fluid level systems, transmission and engine temperatures, collision detection systems, hybrid drives, heating/cooling systems, among others. The graphical display 108 may be a liquid crystal display (LCD) or a light emitting polymer display (LPD) that may include a sensitive layer configured to recognize direct input applied to the surface of the graphical display 108. For example, the position of the direct input, the pressure of the direct input, or general direction of the direct input may be recognized in order to obtain input from a vehicle operator. In other embodiments, the truck 100 includes conventional operator control inputs (not illustrated), for obtaining input from a vehicle operation that may include, but are not limited to, buttons, switches, knobs, etc.

In the illustrative embodiment depicted in FIG. 1, the electronic control unit 106 includes a memory 114 with a random access memory ("RAM") 115 and an electronically erasable, programmable, read-only memory ("EEPROM") 116, a processor 118, and an instrument enhancement module 120. Those skilled in the art and others will recognize that the EEPROM 116 may be a nonvolatile memory capable of storing data even through interruptions in the availability of power. Conversely, the RAM 115 may be a volatile form of memory that stores program instructions for direct access by the processor 118. Typically, a fetch-and-execute cycle in which instructions are sequentially "fetched" from the RAM 115 and executed by the processor 118 is performed. In this regard, the processor 118 is configured to operate in accordance with executable instructions that are available from the RAM 115.

As used herein, control units, control modules, program modules, etc., can contain logic for carrying out general or specific operational features. This logic can be implemented in hardware components, such as analog circuitry, digital circuitry, processing units, or combinations thereof, or software components having instructions which can be processed by the processing units, etc. Therefore, as used herein, the term "control unit" can be used to generally describe these aforementioned components, and can be either hardware or software, or combinations thereof, that implement logic for carrying out various aspects of the present disclosure.

As further illustrated in FIG. 1, the electronic control unit 106 includes an instrument enhancement module 120 that improves the usability of a vehicle instrument panel. In particular, the instrument enhancement module 120 provides logic for rendering one more instruments with visual attributes that more quickly draw a vehicle operator's attention to an abnormal reading. As used herein, the term "instrument" is broadly applicable and may include gauges, indicators, or any other visual representation presented on a graphical display capable of conveying a reading. In this regard, an instrument may be comprised of various "symbol graphics" that include, but are not limited to, text, icons, schematics, images, and combinations thereof. In one embodiment, when an instrument's reading is within normal parameters, the instrument border is represented in a non-distinguishing or "normal" color. If an abnormal reading is detected, an additional visual indicator is provided to draw the vehicle operator's attention to the instrument, and thus, the abnormal reading. In particular, the visual attributes of the instrument border can be changed to any number of different colors, patterns, luminance, and/or flashed. Such a representation provides the vehicle operator with a much better indicator of a vehicle condition that may require corrective action. Moreover, the visual attributes used to convey an abnormal reading may be configured by a user and/or fleet operator without having to change part tooling of the instrument panel.

As will be appreciated by those skilled in the art and others, FIG. 1 provides an example of one system architecture for implementing aspects of the present disclosure. In other embodiments, the functions and features of the truck 100 may be implemented using other components. For example, while FIG. 1 depicts an electronic control unit 106 that uses an EEPROM 116 for nonvolatile memory storage, those skilled in the art and others will recognize that other types of memory may be used. Thus, FIG. 1 depicts one component architecture for practicing the present disclosure, but other component architectures may be used without departing from the scope of the claimed subject matter.

Now, with reference to FIGS. 2A-C, an exemplary instrument that may be used to illustrate aspects of the present disclosure will be described. In the embodiment illustrated in FIGS. 2A-C, a tachometer 200 is depicted that may be used to convey engine speed information. As known to those skilled in the art, the tachometer 200 presents the current engine speed relative to a total range of possible engine speeds. For example, engine speed information may be collected by the electronic control unit 106 from an engine controller or other information generating component 110. The collected data is processed so that the appropriate readings may be represented on the tachometer 200.

Figure 2A:
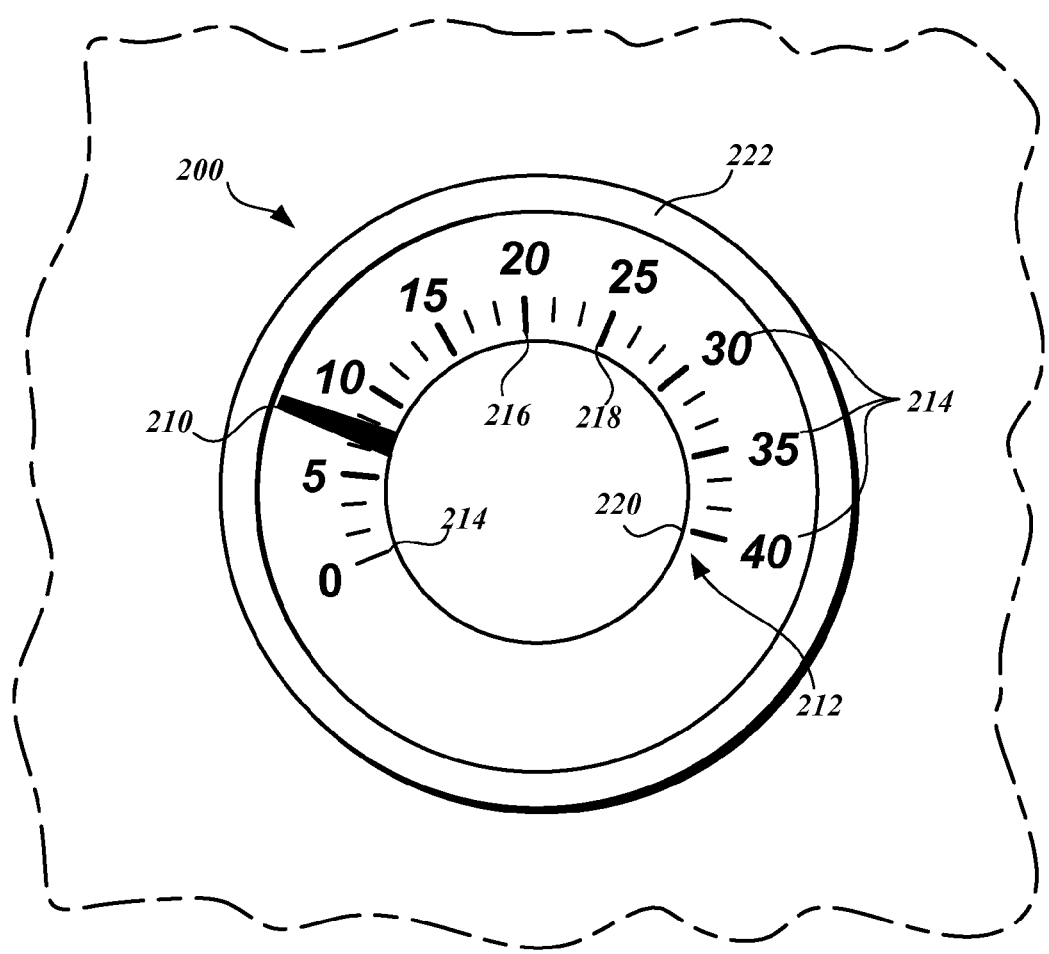
FIG. 2A-C depict an exemplary instrument suitable for illustrating additional embodiments of the disclosed subject matter.

As illustrated in FIG. 2A, the tachometer 200 is comprised of a plurality of symbol graphics that include the needle 210, the scale 212, and the corresponding numeric indicators 214. A needle-sweep technique may be employed in which the position of the needle 210 relative to the scale 212 identifies the current engine speed. Moreover, the tachometer 200 defines three possible ranges for engine speed that include a normal range, warning range, and critical range. In this regard, scale indicators 214 and 216 define the lower limit (e.g., 0 RPM) and upper limit (e.g., 2000 RPM) of the normal range. Similarly, the scale indicators 216-218 and 218-220 define the bounds of the warning range and critical range, respectively. In the embodiment depicted in FIG. 2A, the engine speed (as reflected in the position of the needle 210) is within the normal range. Since the engine speed is considered normal, the visual attributes of the instrument border 222 do not distinguish the tachometer 200 from readings conveyed by other instruments. In this regard, the instrument border of each instrument on an instrument panel may be depicted with the same non-distinguishing visual attributes and/or color (e.g., white, black, blue, etc.) when their corresponding values are within a normal range.

Figure 2B:
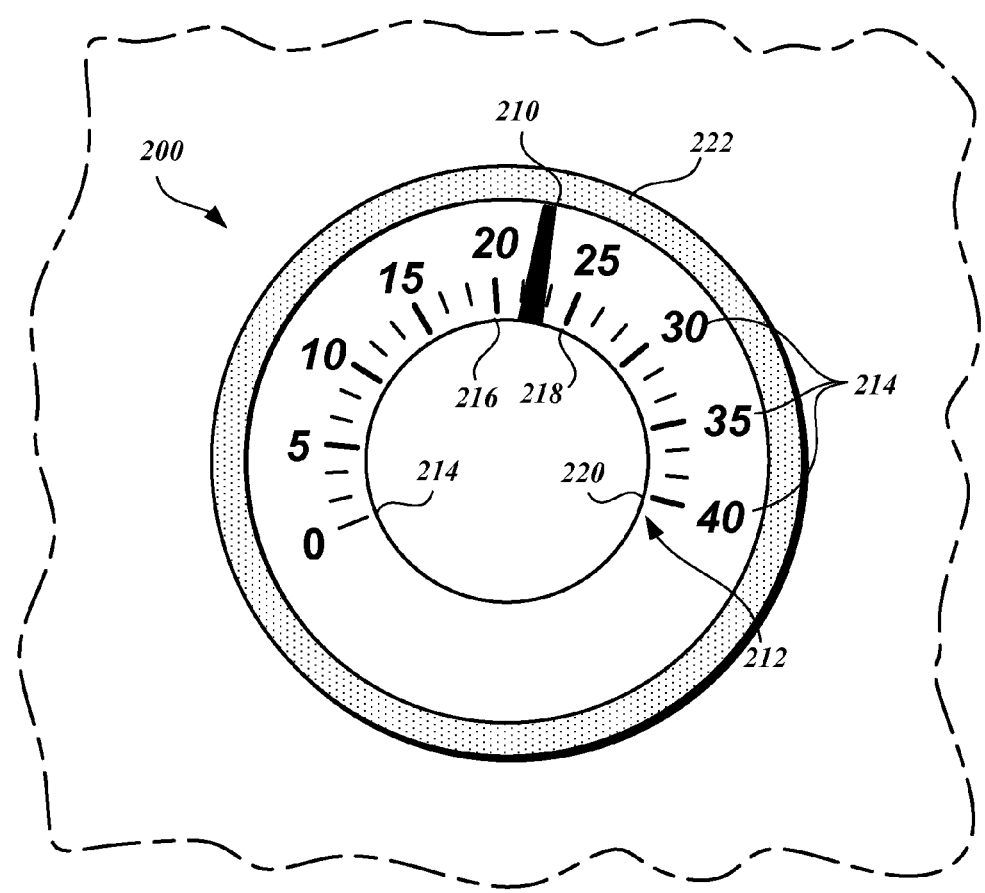

FIG. 2B includes the tachometer 200 that was described above with reference to FIG. 2A. However, in the example depicted in FIG. 2B, the current engine speed increased from the exemplary embodiment described above with reference to FIG. 2A and is now in the warning range. In this instance, a visual indicator may be provided to warn the vehicle operator about the excessive engine speed. Specifically, the appearance of the instrument border 222 can be changed to any number of different colors, patterns, luminance, and/or flashed in order to provide a readily understandable visual indicator about the warning condition. When the upper limit of the normal range is exceeded, for example, the color of the instrument border 222 color may change from the non-distinguishing color (e.g., white, black, blue, etc.) to a color indicative of a warning condition (e.g., yellow).

Figure 2C:
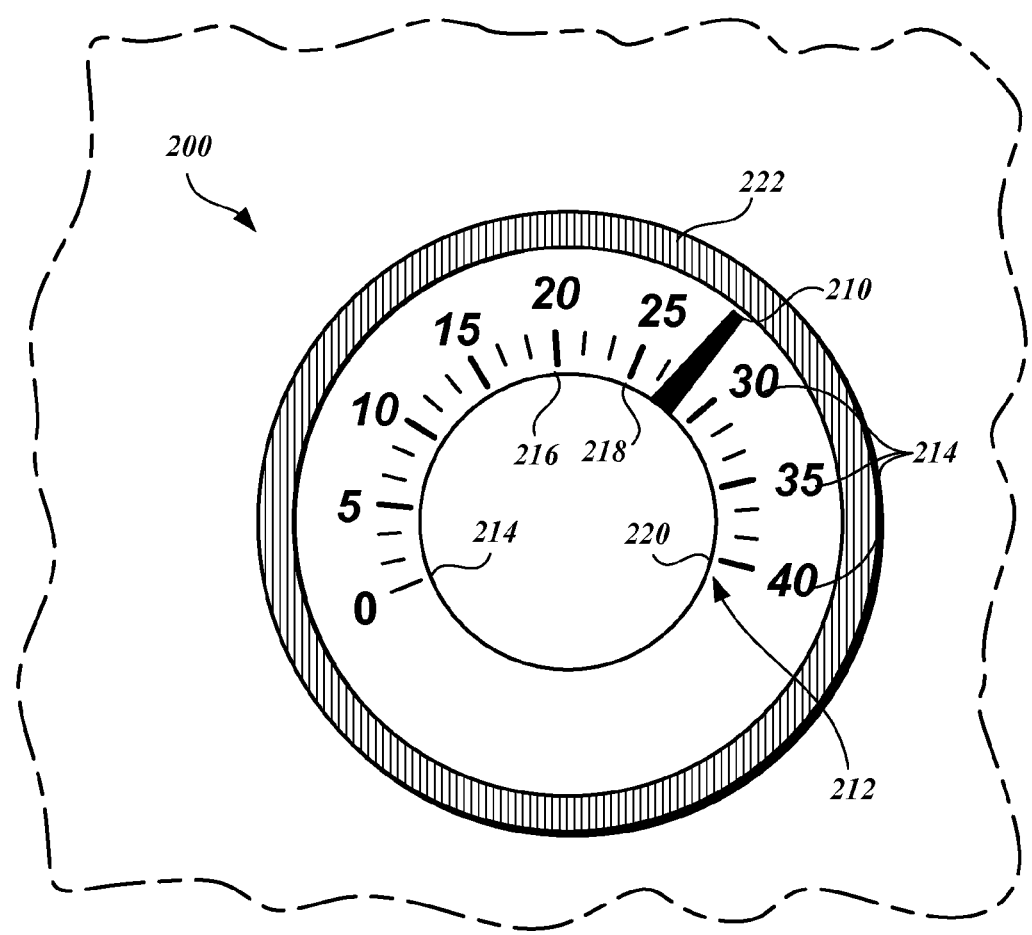

FIG. 2C includes the tachometer 200 that was described above with reference to FIGS. 2A-B. However, in the example depicted in FIG. 2C, the engine speed increased further and is now in the critical range. In this instance, one or more strong visual indicators may be provided to clearly notify the vehicle operator about the excessive and potentially dangerous engine speed. Specifically, the instrument border 222 can be changed to any number of different colors, patterns, luminance, and/or flashed in order to provide a readily understandable visual indicator about the critical condition. When the upper limit of the warning range is exceeded, for example, the border 222 color may change from a color indicative of a warning condition (e.g., yellow) to a color indicative of a critical condition (e.g., red). Moreover, additional visual indicators may be provided to quickly draw the vehicle operator's attention to this type of critical vehicle condition. For example, if the engine speed increases above another threshold level, the visual attributes of the instrument border 222 may be animated to rapidly alternate between highly contrasting colors and/or patterns.

For the sake of convenience, much of the description provided above with reference to FIGS. 2A-C is made in the context of a tachometer 200 and exemplary vehicle readings. However, aspects of the present disclosure are applicable to any instrument that conveys a vehicle reading including but not limited to speedometers, odometers, fuel level gauges, oil level indicators, engine temperature instruments, just to name a few. Depending on the type of reading being conveyed, the visual attributes of an instrument may be changed in other ways than described above. In this regard, the tachometer 200 described above, defines three possible ranges for engine speed that include the normal range, warning range, and critical range. However, the visual attributes of other types of instruments are modified in a way that is appropriate given the type of reading being conveyed. Accordingly, it should be well understood that the examples provided above are applicable in other contexts and should not be construed as limiting.

Now with reference to FIG. 3, a flow diagram that depicts one exemplary embodiment of an enhancement method 300 formed in accordance with the disclosed subject matter will be described. In one embodiment, the enhancement method 300 may be implemented by the enhancement module 120 in the electronic control unit 106 (FIG. 1). Accordingly, data may be collected from a plurality of information generating components 110 so that the appropriate readings may be presented on the graphical display 108. As a preliminary matter, those skilled in the art will appreciate that a control unit is typically designed to operate in a continual manner, i.e., once initialized and operating, the electronic control unit 106 continually monitors and reports vehicle readings. Accordingly, while the enhancement method 300 depicted in FIG. 3 includes a begin and end terminal, the method 300 operates continually until the electronic control unit 106 is powered down.

Figure 3:
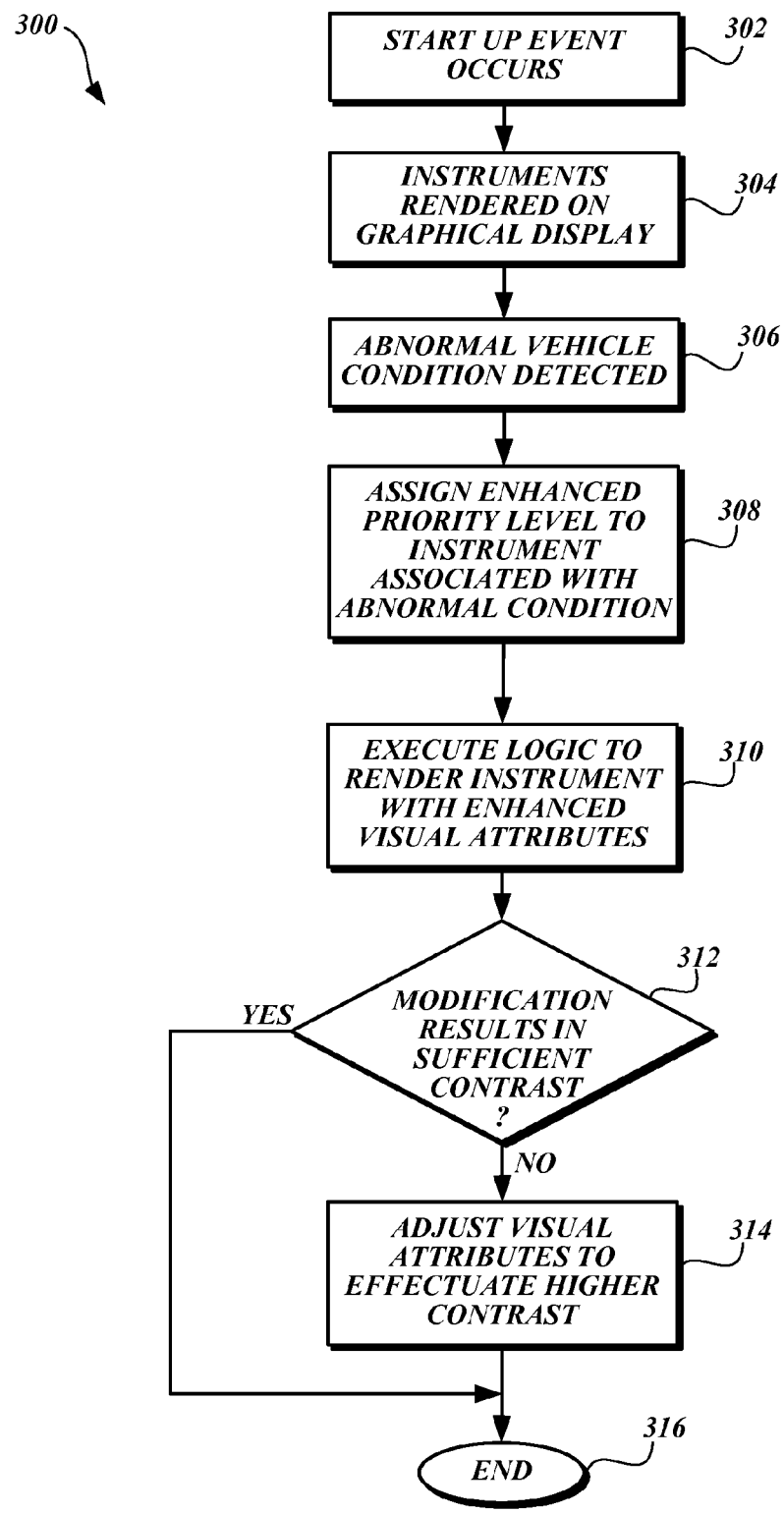
FIG. 3 is a flow diagram of an enhancement method for that improves the usability of an instrument panel in accordance with additional embodiments of the disclosed subject matter.

As illustrated in FIG. 3, the enhancement method 300 begins at block 302 where a start-up event occurs that will cause one or more instruments to be rendered on the graphical display 108. Generally described, a start-up event is an event type that will cause the graphical display 108 to transition from an inactive state to an active state. By way of example only, the start-up event that occurs at block 302 may be the ignition of the vehicle's engine, which results in power being supplied to an ignition bus. Also, the graphical display 108 may be put to "sleep" in a reduced power state when the vehicle is inactive for a predetermined period of time. Thus, the start-up event may be another type of event, such as the return of the graphical display 108 from a reduced power state.

As further illustrated in FIG. 3, the enhancement method 300 renders a set of default instruments and/or graphics on the graphical display 108, at block 304. The instruments that are rendered may be defined in default settings and be similar in appearance to the tachometer 200 depicted in FIGS. 2A-2C. In conjunction with rendering the graphical display 108, the electronic control unit 106 begins collecting data from the information generating components 110. This data may be continually collected and processed so that current readings may be conveyed on the graphical display 108. As described in further detail below, each instrument that may be rendered on the graphical display 108 is assigned a priority level that can dynamically change based on vehicle conditions. When a reading is within normal operating parameters, a corresponding instrument may be assigned a "normal" priority level. However, an instrument may be reassigned an enhanced priority level if an abnormal condition is detected. This aspect of the present disclosure is described in further detail below.

At block 306 of the enhancement method 300, an abnormal vehicle condition is detected that will instigate a change to the appearance of a corresponding instrument. To detect an abnormal vehicle condition, data collected by the electronic control unit 106 may be compared to a set of data that defines normal operating parameters. For example, a component or vehicle manufacture may establish normal operating parameters for various components and systems. These parameters may be compared to actual readings being reported by the information generating components 110. In instances when an actual reading is outside a normal range, the enhancement method 300 detects an abnormal vehicle condition.

At block 308 of the enhancement method 300, an instrument associated with the abnormal vehicle condition (detected at block 306) is assigned an enhanced priority level. The priority level assigned to an instrument may depend on which vehicle component or system experienced the abnormal vehicle condition. In addition, the priority level assigned may depend on the extent in which a reading diverges from normal parameters. For example, the detection of a high engine speed that diverges substantially from a normal reading may be assigned an enhanced priority level that is indicative of a critical condition. A tire pressure reading that diverges a small amount from normal parameters may be assigned a lower priority level that is indicative of a warning condition. Moreover, a manufacturer, fleet operator, and/or user may define which priority levels will be assigned to various abnormal vehicle conditions. In any event, upon detection of an abnormal vehicle condition, the instrument associated with the abnormal condition is assigned an enhanced priority level at block 308.

At block 310 of the enhancement method 300, logic is executed to modify the appearance of the instrument associated with the abnormal vehicle condition. As described previously with reference to FIGS. 2A-C, the logic executed at block 310 may involve changing the visual attributes on an instrument in various ways. In this regard, the modification to the instruments visual attributes may be based on an assigned priority level. For example, if in instrument (i.e., the tachometer 200) is associated with an enhanced priority level that is critical, the instrument border 222 can be changed to a strong color and/or flashed thereby conveying a readily understandable visual indicator about the critical condition. However, as described above with reference to FIGS. 2A-C, the visual attributes of an instrument may be changed in other ways, without departing from the scope of the claim subject matter.

At decision block 312, a test is performed to determine whether a modification to an instrument's visual attributes resulted in sufficient contrast. In one embodiment, aspects of the present disclosure are implemented in conjunction with a system that allows a user to customize the visual attributes of the instrument panel by, for example, assigning colors to individual instruments, symbol graphics, and corresponding backgrounds. To ensure that an abnormal reading can be identified, the present disclosure provides an automated graphic contrast feature. In particular, a comparison is performed at block 312 to determine if the contrast between an instrument's border and corresponding background is more than a predetermined threshold. For example, in the scenario described above with reference to FIG. 2C, the instrument border 222 is changed to a color indicative of an abnormal vehicle condition (i.e., red). In this instance, the test performed at block 312 determines whether sufficient contrast exists between the color of the instrument border 222 and a corresponding background. If a sufficient amount of contrast exists, the result of the test performed at block 312 is "YES" and the enhancement method 300 proceeds to block 316, where it terminates. If a sufficient amount of contrast does not exist, the result of the test performed at block 312 is "NO" and the enhancement method 300 proceeds to block 314.

At block 314 of the enhancement method 300, a visual attribute of an instrument that conveys information about an abnormal vehicle condition is adjusted to effectuate a higher contrast ratio. If block 314 is reached, sufficient contrast between an instrument border and a corresponding background does not exist and changes are implemented, at block 314, to effectuate a higher contrast. In this regard, a visual attribute of the instrument border and/or background that may be modified to effectuate a high contrast include luminance settings and RGB values, among others. Then, once modifications are made that effectuate a higher contrast ratio, the enhancement method 300 proceeds to block 316 where it terminates.

While illustrative embodiments have been illustrated and described, it will be appreciated that various changes can be made therein without departing from the spirit and scope of the invention.

The embodiments of the disclosed subject matter in which an exclusive property or privilege is claimed are defined as follows:

1. In a vehicle that includes a graphical display, a method for conveying information about the vehicle, the method comprising, by one or more processors in a computer system:
   assigning a priority level to an instrument configured to convey a vehicle reading, wherein the instrument comprises a border and a central portion;
   identifying an abnormal condition;
   dynamically assigning an enhanced priority level to the instrument that corresponds to the abnormal condition; and
   causing the graphical display to render a border of the instrument with an enhanced visual attribute configured to indicate the abnormal vehicle condition and distinguish the border of the instrument from a portion of the instrument that lacks the enhanced visual attribute;
   wherein the enhanced visual attribute is configured to distinguish the instrument from one or more other instruments depicted on an instrument panel that are not assigned an enhanced priority level.

2. The method as recited in claim 1, further comprising:
   determining whether a level of contrast between the border of the instrument and a background is below a threshold level of contrast; and
   if the level of contrast is below the threshold level of contrast, increasing the contrast between the border of the instrument and the background to at least the threshold level.

3. The method as recited in claim 2, wherein at least one of a color of the instrument and a background color are configurable and selectable by a user.

4. The method as recited in claim 2, wherein increasing the contrast between the border of the instrument and the background includes modifying at least one of a luminance value and an RGB value of the background.

5. The method as recited in claim 1, wherein to render a border of the instrument with an enhanced visual attribute includes changing at least one of a fill pattern, color, and luminance of the border of the instrument.

6. The method as recited in claim 1, wherein to render a border of the instrument with an enhanced visual attribute includes rapidly alternating the border between different contrasting colors.

7. The method as recited in claim 1, wherein a value of the enhanced priority level assigned to the instrument depends on one or more of which vehicle system experienced the abnormal condition and the extent to which a reading diverges from normal parameters.

8. The method as recited in claim 1, wherein the enhanced visual attribute is configured to indicate a first range of values associated with the abnormal vehicle condition, the method further comprising:
   causing the graphical display to render the border of the instrument with a second visual attribute that differs from the enhanced visual attribute, wherein the second visual attribute is configured to indicate a second range of values associated with the abnormal vehicle condition.

9. The method as recited in claim 8, wherein the first range of values is associated with a warning condition, and wherein the second range of values is associated with a critical condition.

10. A system for providing information to a vehicle operator, comprising:
    a graphical display configured to visually depict at least two instruments;
    a memory having stored therein an enhancement module having program instructions for conveying a vehicle reading on the graphical display;
    a processor configured to execute the program instructions of the enhancement module to:
       assign a priority level to an instrument configured to convey the vehicle reading;
       identify an abnormal condition;
       dynamically assign an enhanced priority level to the instrument configured to convey the vehicle reading that corresponds to the abnormal condition; and
       cause the graphical display to render the instrument, wherein a border of the instrument is depicted with an enhanced visual attribute configured to indicate the abnormal condition and distinguish the border of the instrument from a portion of the instrument that lacks the enhanced visual attribute;
    wherein the enhanced visual attribute is configured to distinguish the instrument from one or more other instruments depicted on the graphical display that are not assigned an enhanced priority level.

11. The system as recited in claim 10, wherein the processor is further configured to:
    determine whether a level of contrast between the border of the instrument and a background is below a threshold level of contrast; and
    if the level of contrast is below the threshold level of contrast, increase the contrast between the border of the instrument and the background to at least the threshold level.

12. The system as recited in claim 11, wherein at least one of a color of the instrument and a background color are configurable and selectable by a user.

13. The system as recited in claim 11, wherein to increase the contrast between the border of the instrument and the background includes modifying at least one of a luminance value and an RGB value of the background.

14. The system as recited in claim 10, wherein the enhanced visual attribute includes at least one of a fill pattern, color, and luminance of the border of the instrument.

15. The system as recited in claim 10, wherein the enhanced visual attribute includes alternating colors.

16. The system as recited in claim 10, wherein a value of the enhanced priority level assigned to the instrument depends on one or more of which vehicle system experienced the abnormal condition and the extent to which a reading diverges from normal parameters.

17. A non-transitory computer-readable medium having modules comprising:
- a detection module comprising computer-executable instructions configured to cause a computer to collect data from a plurality of vehicle systems and identify an abnormal condition from the collected data;
- a prioritization module comprising computer-executable instructions configured to cause a computer to assign a normal priority level to an instrument if the instrument corresponds to a normal reading and re-assign the instrument an enhanced priority level if the instrument corresponds to an abnormal reading; and
- an enhancement module comprising computer-executable instructions configured to cause a computer to identify that the instrument is assigned an enhanced priority level and cause a graphical display to render a border of the instrument with a distinguishing visual attribute;

wherein the distinguishing visual attribute is configured to differentiate the appearance of the instrument from one or more other instruments depicted on an instrument panel that are not assigned an enhanced priority level and differentiate the border of the instrument from a portion of the instrument that lacks the distinguishing visual attribute.

18. The non-transitory computer-readable medium as recited in claim 17, further comprising an adjustment module comprising computer-executable instructions configured to cause a computer to:
- identify the amount of contrast between a border of the instrument and a background; and
- if the amount of contrast is below a threshold level of contrast, increase the contrast to at least the threshold level.

19. The non-transitory computer-readable medium as recited in claim 17, wherein the distinguishing visual attribute includes at least one of a fill pattern, color, and luminance of the border of the instrument.

20. The non-transitory computer-readable medium as recited in claim 17, wherein the distinguishing visual attribute includes alternating colors.

* * * * *